United States Patent [19]
Huston et al.

[11] 3,817,584
[45] June 18, 1974

[54] BRAKE CONTROL VALVE

[75] Inventors: John T. Huston, Livonia; Raymond F. Toohey, Lincoln Park, both of Mich.

[73] Assignee: Ford Motor Company, Dearborn, Mich.

[22] Filed: July 21, 1972

[21] Appl. No.: 273,882

[52] U.S. Cl. .................. 303/6 C, 188/349
[51] Int. Cl. ............................ B60t 11/34
[58] Field of Search .......... 303/6 C, 84 A; 188/349, 188/152, 151 A; 60/54.5 E; 137/508, 493.6, 493.8, 505.25, 512.1, 98–102, 87; 200/82 D; 340/52 C

[56] References Cited
UNITED STATES PATENTS 3,423,936   1/1969   Stelzer ........................... 60/54.5 E
3,441,318   4/1969   Bueler ............................... 303/6 C
3,706,477   12/1972  Stelzer .......................... 137/505.25

Primary Examiner—Duane A. Reger
Assistant Examiner—D. C. Butler
Attorney, Agent, or Firm—Joseph W. Malleck; Keith L. Zerschling

[57] ABSTRACT

A redundant hydraulic braking system having a pair of differentially calibrated pressure proportioning valves in parallel to secure proportioning in more than one mode of the system; proportioning is selected to occur only after a predetermined degree of linear deceleration (corresponding to a predetermined degree of master cylinder pressure) has been experienced in either mode.

6 Claims, 4 Drawing Figures

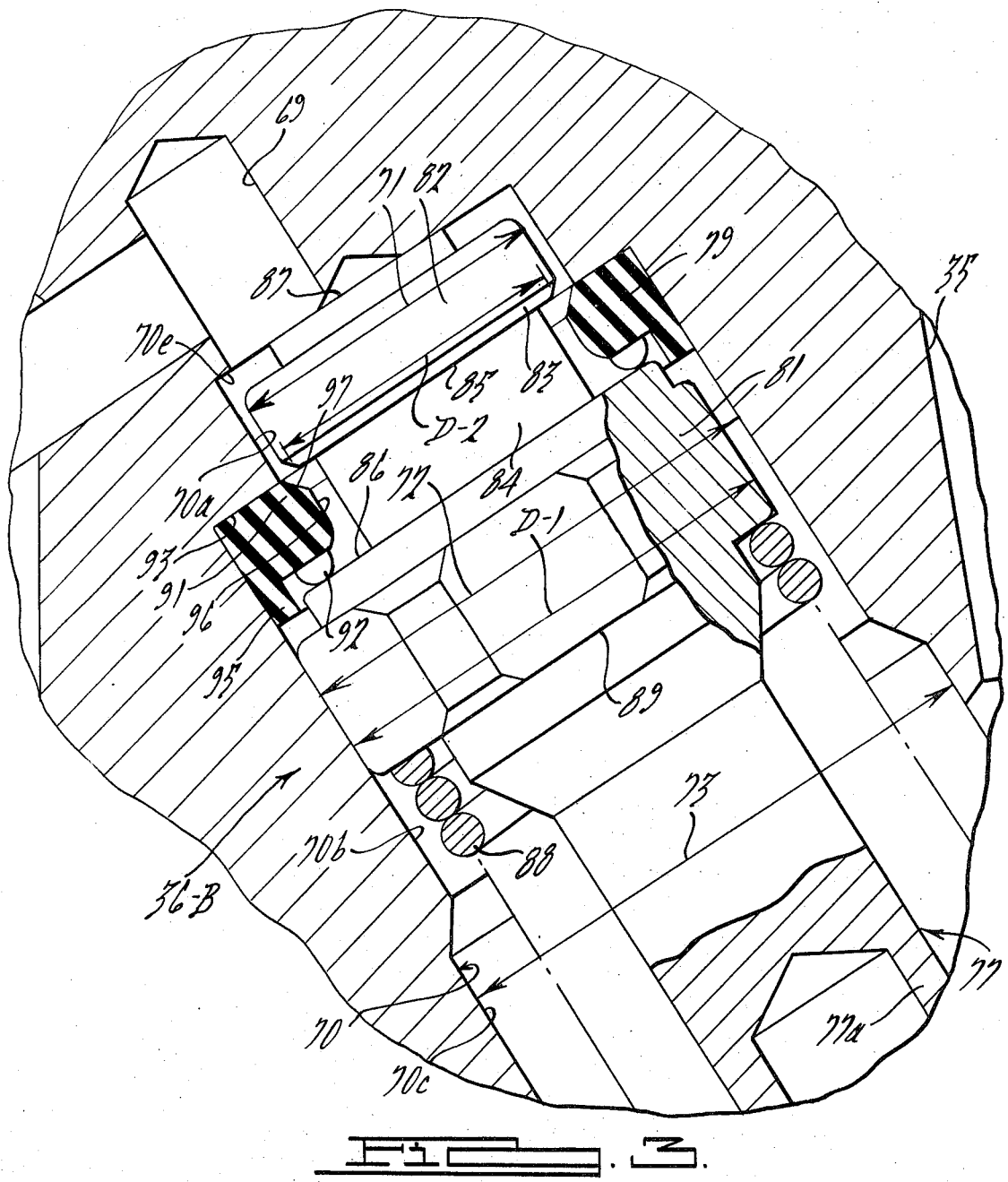

BRAKE CONTROL VALVE

BACKGROUND OF THE INVENTION

This invention relates to vehicular hydraulic brake systems and particularly to a redundant system having a multiple of pressure proportioning valves adapted to modulate fluid pressure in conformity with a change in fluid braking pressure corresponding to vehicular deceleration during more than one mode of operation (a fully operable mode of all circuits as well as a failed mode of at least one of the circuits).

It is well known in the automotive art that the effective braking effort of which a vehicle wheel is capable is dependent upon the weight carried by that particular wheel and the coefficient of friction between the wheel and the road; the proportion of the weight of the vehicle that is borne by the wheels of a given axle or a given pair of wheels does not remain static and under braking a couple is developed which results in a percentage of the weight of the car borne by the rear wheels being transferred to the front wheels. Automotive engineers have particularly used master cylinder pressure developed by manual braking effort as a fairly good approximation of the rate of change of deceleration and corresponding weight shift.

Various devices have been proposed which are responsive to changes in master cylinder pressure (and thereby deceleration) to limit the brake pressure applied to the rear wheels upon the attainment of a predetermined pressure level. One prevalent device is that shown in U.S. Pat. No. 3,423,936 which normally permits full communication therethrough to maintain the rear and front braking pressure the same until a predetermined split point is reached at which time the valve begins to deliver a modulated pressure at a specific ratio to that received (front brake pressure). However, redundant systems utilizing this type of valve have not taken into consideration the requirement for proportioning in different modes of the system if optimum braking is to be obtained in a broader range of operating conditions. "Optimum" is used to mean that substantially all of the potential tractive forces which the tires can exert against the road surface are being utilized.

It is, therefore, an object of this invention to provide a proportioned redundant braking system that is operative when a hydraulic failure occurs at one point in the system to provide optimum braking performance in either the fully operable or the failed mode. Particular structural features pursuant to this object comprise (a) the use of a shuttle valve responsive to a change of position of a normally balanced valve to indicate a failure in the system, the shuttle valve being effective to shut off fluid flow through one branch of parallel-arranged pressure proportioning valves; (b) the use of differentially calibrated pressure proportioning valves in parallel whereby the combined output pressure will be the resultant of the highest calibrated valve; (c) the calibration of the proportioning valves to account for a contemplated change in hydraulic effectiveness of braking cylinders not in the particular hydraulic line of which the proportioning valves are a part.

BRIEF SUMMARY OF THE DRAWINGS

FIG. 3 is an enlarged view of a portion of FIG. 2 as indicated.

DETAILED DESCRIPTION

Figure 1:
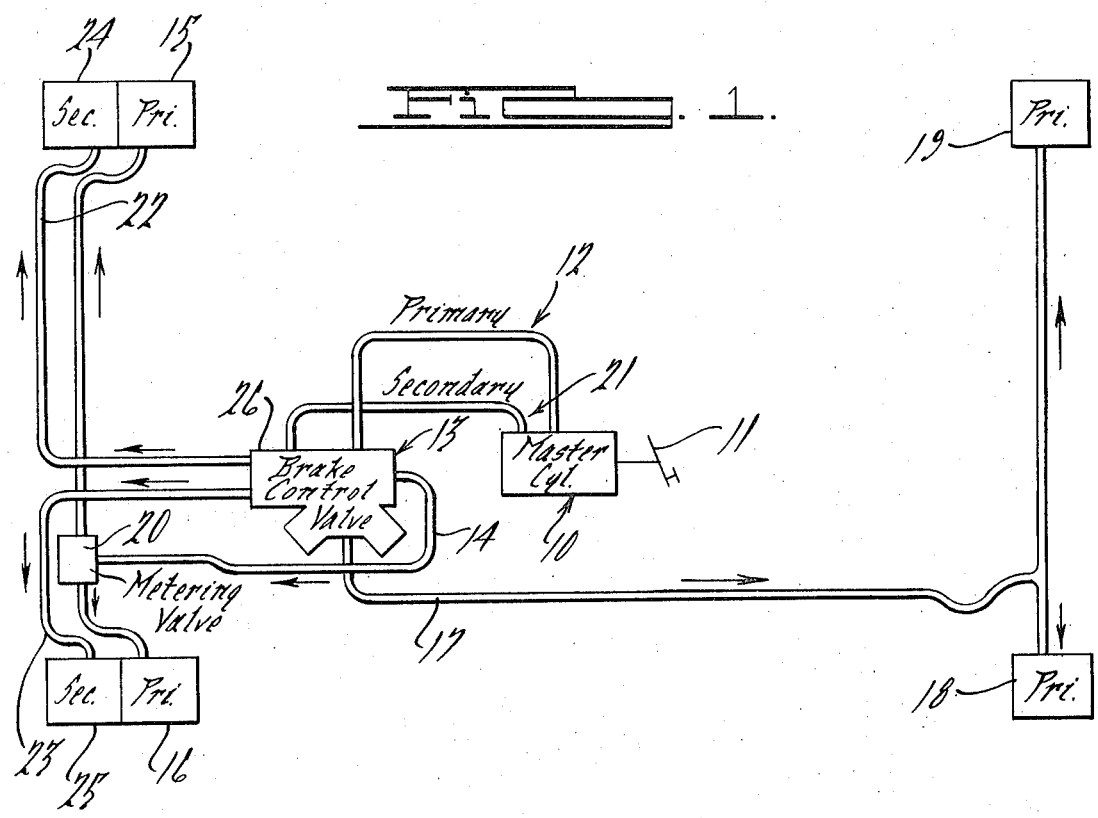
FIG. 1 is a schematic illustration of a redundant braking system useful to embody this invention.

For purposes of illustration of a preferred embodiment, the schematic lay out of a four by two type redundant braking system is illustrated in FIG. 1; this is a system in which more than one independent hydraulic circuit is provided between the master cylinder and independent wheel braking cylinders, one circuit having four wheel cylinders (two on each axle) and another circuit has two wheel cylinders. Should malfunctioning occur in one of the hydraulic circuits, the remaining hydraulic circuit is available to apply some form of braking effort to the wheels. More particularly, a dual master cylinder 10 (which may have a power booster associated therewith) generates equal but separate pressures in response to manual pressure applied by the foot pedal 11. For purposes of identification, one of the circuits shall be called primary and the other secondary although this is not to indicate the relative importance in the braking system. In the preferred embodiment, the primary circuit 12, after passing through the control valve 13, has one branch 14 conducting fluid to a pair of front wheel brake cylinders 15 and 16 and another branch 17 conducting fluid to a pair of rear brake cylinders 18 and 19. A metering valve 20 is interposed in branch 14 leading to the front primary brake cylinders and its function will be described later. The secondary circuit 21, after passing through the control valve 13, has independent branches 22 and 23 leading respectively to the right and left front braking cylinders 24 and 25. The braking cylinders (24, 25, 15, 16) for the front wheels can be typically arranged in tandem pairs for use in a disc brake or the like. The secondary branches 22 and 23, leading to the front cylinders, are also metered by metering valve 26 integrally contained within the control valve.

Figure 2A:
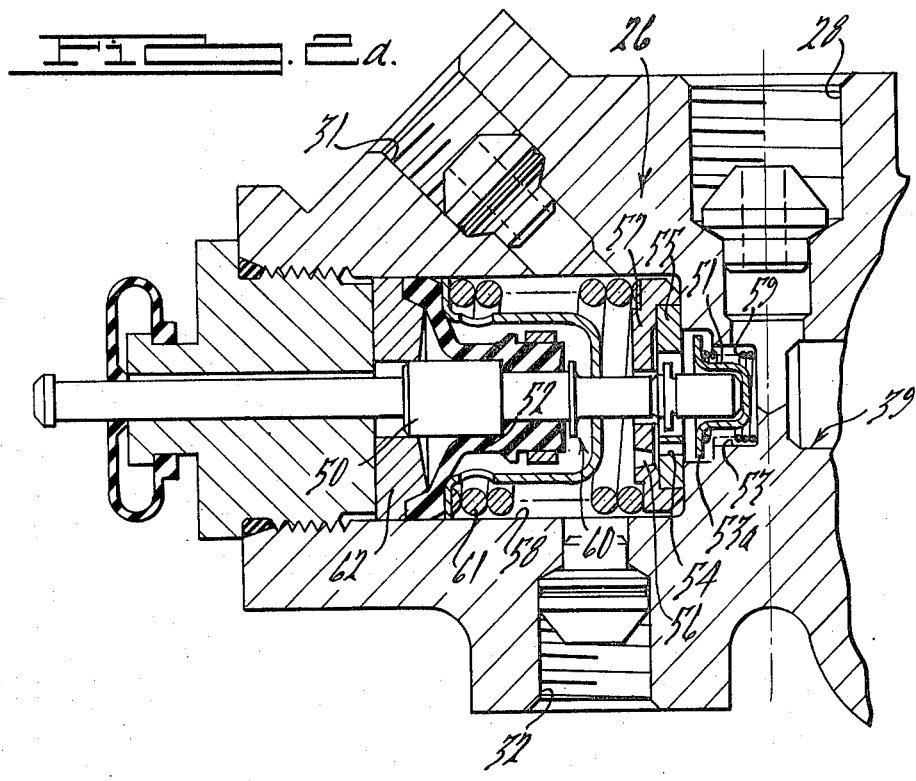
FIGS. 2a and 2b represent a central sectional elevational view of a control valve effective to modulate braking pressure in the redundant braking system of FIG. 1 in both the operating and failed modes.
Figure 2B:
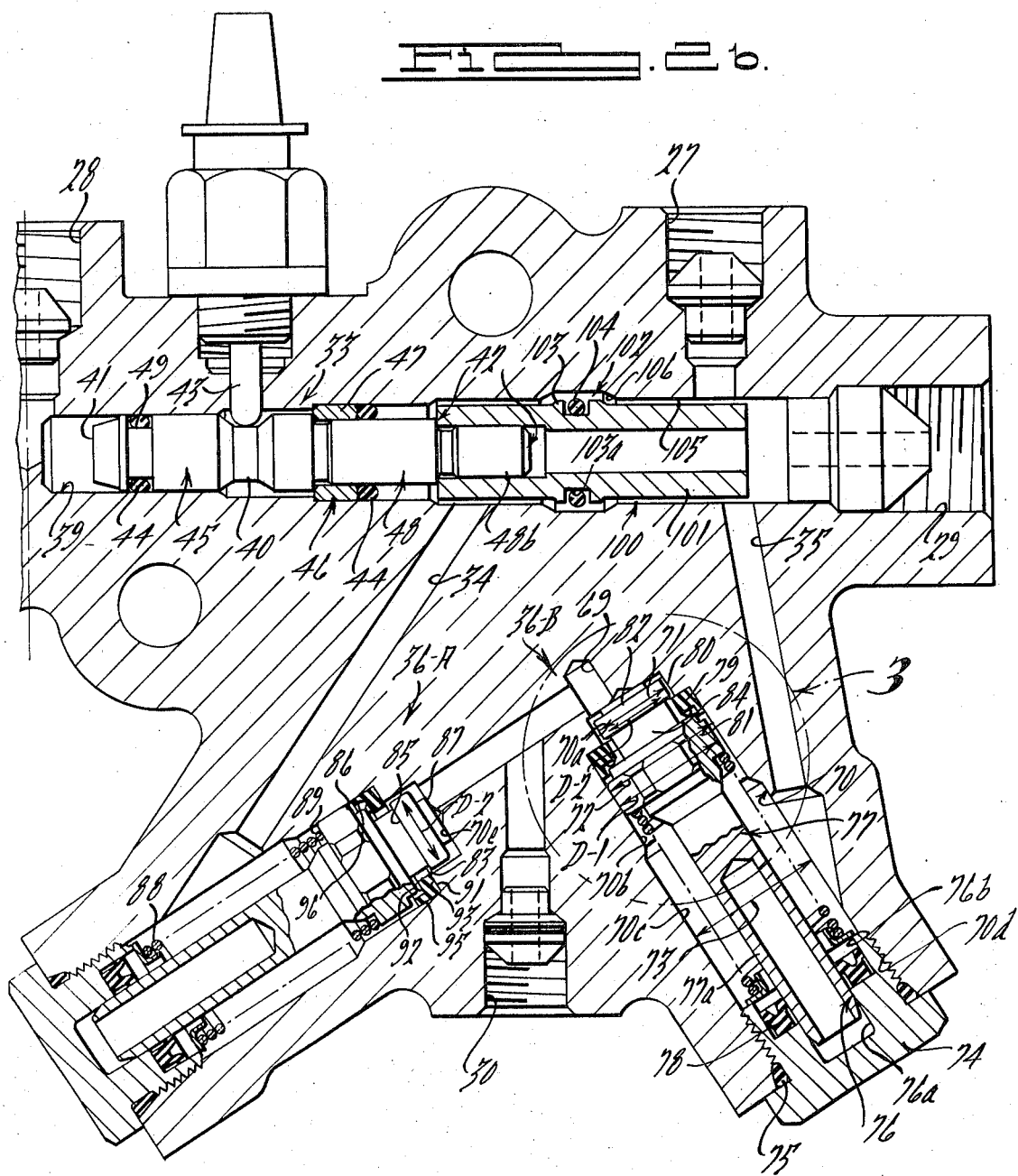

Turning to FIG. 2, the control valve broadly comprises fluid pressure inlets 27 and 28 connected respectively with primary and secondary fluid pressure. A pair of outlets 29 and 30 are provided for the primary hydraulic fluid, outlet 29 delivering unproportioned brake fluid maintained at master cylinder pressure for use in the front brake cylinders 15 and 16; outlet 30 receives proportioned brake fluid for delivery to the rear brake cylinders 18 and 19. A pair of outlets 31 and 32 are arranged respectively to deliver secondary fluid to front wheel secondary cylinders 24 and 25.

To generate a signal of a failed mode of the braking system, a balance valve means 33 is employed to which the primary and secondary fluid pressures are communicated, the pressures thence being conducted for possible further pressure regulation: secondary fluid pressure is communicated to the metering valve 26 and primary fluid pressure is communicated firstly to a remote metering valve 20, other primary fluid pressure is conducted to parallel passages 34 and 35 in which the proportioning means 36 is disposed for controlling the fluid finally conducted to the rear braking cylinders 18 and 19.

The balance valve means 33 (fluid pressure comparator) comprises a spool element 38 slidably received in a stepped bore 39. A midsection of the spool element has a reduced double-tapered section 40 whereupon with equal fluid pressures applied to opposite end faces 41 and 42, a switch element 43 is normally biased to nest within said double-tapered section in a nonenergized switch condition. Division between the fluid pressures is obtained by suitable O-rings 44 disposed in grooves 49 in both cylindrical sections 45 and 46 to seal with the walls of bore 39. Cylindrical section 46 is for convenience here defined by a sleeve 47 press-fitted upon a smaller diametrical extension 48. Loss of pressure on either end face will urge the spool in a direction away from the remaining pressure to a position whereby switch element 43 is forced out of the section 40 and in a raised position transmits a warning signal that there has been a loss of pressure in one circuit.

The friction pads of the front brakes are normally calibrated to have greater braking force than the rear braking pads and therefore if uniform fluid pressures were communicated to all of the braking cylinders in the low range of master brake cylinder pressure, there would be an undesirable brake force distribution. To match more effectively an ideal braking condition using each wheel optimally, when differential braking pads are used, metering valves 20 and 26 are employed. As shown in FIG. 2, each metering valve functions as follows: in the released position a pushrod 50 and a check valve 51 are normally urged to the extreme right hand position as shown in the figure as the result of the resilient force of diaphragm 52. This normally permits fluid flow through the metering valve by passage of fluid from the inlet opening 53 around the diametrical extremity 53a of the check valve, through the ports 54 in valve seat disc 55 and through ports 56 in the annular metering valve element 57 which ultimately is conducted through the stepped bore 58 (defining a fluid chamber in communication with both outlets 31 and 32). As initial fluid pressure builds up from the inlet 28 (resulting from light pedal pressure) for example up to 30 psi; the low pressure acts on the diaphragm 52 permitting the pushrod 50 to be urged by the resilient spring 59 and close off the ports 54 in the valve seat to prevent fluid flow to the front brake cylinders.

As pressure increases from the master cylinder continue, for example, above 30 psi and up to a pressure of about 117 psi, the metering valve will remain closed. At about 117 psi, which is determined as a minimum pressure at which fluid should be communicated to the front brakes (as a result of friction pad proportioning in one design) fluid will act upon the valve seat disc 55 and overcome the force of spring 59 to provide a slight opening of the space between the front face of the metering valve element 57 and the disc 55. Fluid pressure communicated to outlets 32 and 31 is at a reduced pressure, the pressure differential gradually becoming less as the inlet pressure is increased until at a blend point (approximately 440 psi in this example) the pressures at the inlet and outlet are the same and further increase in master cylinder pressure for the secondary circuit will permit full pressure communication. The blend point occurs when the force of the hydraulic pressure against the area 60 of the pushrod equals the force of spring 61, the latter will be compressed until the pushrod 50 stops, holding the valve plate 57 in the opened position. When the brake is released, fluid is permitted to return through the openings 56 and 54 to the inlet by unseating the check valve.

During this period of operation when the metering valves are withholding full fluid pressure from the front brakes, full fluid pressure is communicated to the rear brakes. Above 400 psi of supply pressure, the proportioning valves begin to restrict fluid pressure to the rear brakes. When the piston 45 is in its balanced position for the normal operating mode of the systems, with no failure in either of the hydraulic circuits, the highest calibrated proportioning valve 63 is effective to allow full fluid communication to the rear brakes until a split point (approximately 300 to 500 psi as an example) is reached.

Each of the proportioning valves are identical in structure and function and therefore description of one serves for the other. A fluid chamber is defined by stepped bore 70 having wall 70a (with a small diameter 71) adjacent the fluid exit 72; cylindrical wall 70b defines the second step having a diameter 72, and a cylindrical wall 70c having a diameter 73. A cap 74 is employed to close bore 70 at its mouth 70d; cap 74 has suitable sealing means 75 and an internal stepped bore 76, portion 76a is adapted to pilot an extension 77a of a shiftable element 77 therein for sliding movement and portion 76b receives a sealing ring 78 for fluidly sealing against the exterior of the extension.

Element 77 cooperates with a resilient annular flow controller 79 to define a variable flow orifice at 80 in the chamber 70. Fluid forces acting on differential surface areas of the element 77 and controller 79 determine the precise spacing defining the condition of the orifice.

The shiftable element (or piston) 77 has a cylindrical portion 81 with the largest diameter D-1 hereof and it is with cylindrical wall 70b of the bore 70 having a slightly greater diameter 72. Downstream the piston has a cylindrical portion 82 with a smaller diameter, carrying a narrow conical surface 83 (determining orifice 80) having an effective diameter D-2. Reduced section 84 connects portions 81 and 82 providing shoulders 85 and 86 for contacting the controller. The piston is normally urged to an open orifice position (whereby the piston end 87 abuts the end 70e of the bore 70) by coiled spring 88 operating against a shoulder 89 of the piston and a spring operating against a shoulder 89 of the piston and a spring retainer 90 bearing against the cap 74.

The resilient flow controller 79 has an annular body provided with an interrupted shoulder 91 and an interrupted shoulder 92 adapted to engage respectively shoulder 93 of the bore or shoulder 86 of the piston. The outer periphery of the controller maintains a fluid sealed relationship with the bore by way of lip 95 and maintains a spaced relationship between its inner periphery 96 and the piston. In the biased open position of the piston shoulder 86 urges the controller against shoulder 93. Full fluid pressure is passed through valve 36 since fluid can flow between the interruptions on the shoulders 91 and 92. When pressure in the outlet 30, acting across diameter D-1, exceeds the force of spring 88 the piston moves surface 83 to close against a mating surface 97 on the controller, completing a closure of the valve 36. If pressure exceeds the closure or split point, counter fluid forces acting on the surface difference between D-1 and D-2 will crack open the orifice and modulate outlet pressure at a reduced value. The differential is slight so that there is a quick recycling of the proportioning valve. Increases in inlet pressure over the split point will result in a delivered outlet pressure at a predetermined ratio required to obtain uniform loading of the wheel braking means.

Shuttle valve means 100 is responsive to the axial position of the balancing valve 33 to open or close fluid communication between inlet 27 and passage 34 thereby determining the mode of pressure porportioning to outlet 30. Shuttle valve means 100 comprises a sleeve member 101 press-fitted onto finger 48b, of piston 48; a mid-section of the sleeve has an annular protrusion 102 defined by a ridge 103 having a groove 103a with an O-ring 104 disposed therein (the outer extremity of O-ring 104 is slightly beyond than extremity of ridge 103). Protrusion 102 normally resides in and is spaced from a recess 106 defined in the cylindrical wall 105 (the latter being an extension of bore 39 and defines a fluid chamber for the shuttle valve means); sleeve 101 normally is concentrically aligned in wall 105 and is spaced therefrom so that fluid is free to flow between inlet 27 and passage 34. If the sleeve 101 is carried to the right or left, as a result of translation of piston 48 due to a failed mode of the braking system, protrusion 102 is withdrawn from recess 106 and O-ring 104 seals against wall 105 blocking fluid flow to passage 34.

During the normal functional mode of the brake system, primary fluid pressure enters inlet 27 and is conducted in three directions, first to outlet 29 (where pressure will be monitored by the metering valve 20 to have a predetermined valve before actuating front brake cylinders 15 and 16), and to both passages 34 and 35 because shuttle valve means 100 is in a centered position (due to equal pressures acting on ends 41 and 42 of the fluid comparator 33 controlling movement of the shuttle valve means 100) allowing fluid to flow around sleeve 101. Proportioning valve 36a, being calibrated higher than valve 36b will determine the delivered pressure in outlet 30 in the normal mode even though both passages 35 and 36 are open. The delivered pressure in outlet 30 will build up with primary pressure along a 1:1 ratio until a split point is reached where the force of spring 88 is overcome by pressure in the outlet 30 acting on piston area having diameter D-1, thereby restricting flow to the outlet at a specific designed ratio (such as 2:1) for primary pressure in excess of the split point.

In a failed mode, such as loss of secondary supply pressure, the shuttle valve means 100 is carried to the right, causing protrusion 102 to withdraw from recess 106 and seal against the chamber 105 shutting off fluid flow through passage 34. Fluid is still communicated to passage 35, allowing proportioning valve 36b to determine the delivered pressure in outlet 30; valve 36b typically has a lower calibrated spring 88 which may for example provide for a split point 200 psi lower than for valve 36a and excess primary pressure would rise at a ratio of 3:1 to that of delivered pressure.

We claim:

1. A control valve assembly comprising:
   a. a housing
   b. means for comparing the magnitude of independent fluid pressures supplied to said housing and movable in response to a predetermined pressure differential between said fluid pressures,
   c. means receiving said separate fluid pressures from said comparing means and effective to maintain independent first and second delivered pressures therefrom at least one of which is below said supply pressures until a predetermined increase in said supply pressure is attained,
   d. means defining first and second parallel fluid passages each having an inlet commonly communicating with one of said independent supply pressures and each having an outlet in common communication,
   e. shuttle valve means in said first fluid passage operable between open and closed positions in response to movement of said comparing means,
   f. first fluid pressure proportioning means disposed in said first fluid passage effective to receive fluid from said shuttle valve means and provide a third delivered fluid pressure lower than said one supply pressure,
   g. second fluid pressure proportioning means disposed in said second fluid passage effective to receive fluid from said shuttle means and provide a fourth delivered fluid pressure lower than said third delivered fluid pressure, whereby in the open position of said shuttle valve the fluid pressure in said common outlet will be governed by said first portioning means, and in the closed position of said shuttle valve means the fluid pressure in said common outlet will be governed by said second proportioning means.

2. A control valve assembly as in claim 1, in which said comparing means has a valve member movable from a normally centered position to opposed translated positions in said housing responsive to oppositely directed pressure differentials in excess of a predetermined amount between the magnitudes of the supplied fluid pressures acting thereon, said translated position being indicative of a fluid failure in one of said supply pressures.

3. A control valve assembly as in claim 1 in which each said proportioning means comprises
   a shiftable element responsive to fluid pressure of said one supply pressure and the respective delivered pressure for movement between first and second positions,
   a flow controller in fluid sealing engagement with the passage containing said shiftable element and operating to permit full fluid communication through said proportioning means when said element is in said first position and to provide pressure reduction through said proportioning means when said element is substantially in said second position, said second position having said controller in fluid sealing contact with said element whereby fluid flow is prevented.

4. A control valve assembly as in claim 3, in which said flow controller and element each have a narrow conical surface for mating, the spacing between said surfaces providing a modulated pressure reduction.

5. A valve assembly as in claim 1, in which said shuttle valve means particularly comprises a sleeve member translatable with movement of said comparing means, a shuttle valve chamber within which said sleeve member is slidable, said chamber having an annular recess therein, and said sleeve having an annular resilient protrusion normally disposed in said recess and effective to engage said chamber walls when said sleeve is moved to a position whereby said protrusion is withdrawn from the recess.

6. In a braking system having redundant hydraulic circuits, the combination comprising:
   a. primary hydraulic braking means in one of said circuits having first and second portions each subject to differential loading resulting from deceleration effects;
   b. secondary hydraulic braking means in the other of said circuits effective to assist one of said first or second portions of the primary hydraulic braking means; and
   c. fluid pressure proportioning means in said one circuit and normally operative to maintain the total applied braking force of said primary and secondary braking means proportioned at a first predetermined ratio to obtain uniform loading and operative upon failure of one of said circuits to maintain the applied braking force of the remaining braking means proportioned at a second predetermined ratio of obtain uniform loading, said proportioning means comprises a multiple of differentially calibrated proportioning valves connected in parallel in one of said circuits, and balancing means responsive to pressure in both said circuits to normally provide fluid flow through each of said valves and upon failure of pressure in one of said circuits to prevent fluid flow through at least one of said valves.

* * * * *